United States Patent
Chavez et al.

(10) Patent No.: US 9,742,715 B1
(45) Date of Patent: Aug. 22, 2017

(54) METHOD AND SYSTEM FOR STORING REAL-TIME COMMUNICATIONS IN AN EMAIL INBOX

(71) Applicant: Google Inc., Mountain View, CA (US)

(72) Inventors: Roderick Adonis Chavez, Kirkland, WA (US); David Bau, Gladwyne, PA (US); Gary S. Burd, Kirkland, WA (US)

(73) Assignee: Google Inc., Mountain View, CA (US)

( * ) Notice: Subject to any disclaimer, the term of this patent is extended or adjusted under 35 U.S.C. 154(b) by 87 days.

(21) Appl. No.: 14/062,592

(22) Filed: Oct. 24, 2013

Related U.S. Application Data

(63) Continuation of application No. 11/173,767, filed on Jun. 30, 2005, now Pat. No. 8,577,967.

(51) Int. Cl.
*H04L 12/58* (2006.01)

(52) U.S. Cl.
CPC .............. *H04L 51/22* (2013.01); *H04L 51/16* (2013.01); *H04L 51/36* (2013.01)

(58) Field of Classification Search
CPC ................................ H04L 51/36; H04L 51/16
See application file for complete search history.

(56) References Cited

U.S. PATENT DOCUMENTS

| | | | |
|---|---|---|---|
| 5,951,638 A * | 9/1999 | Hoss | H04L 51/36 709/206 |
| 6,430,174 B1 * | 8/2002 | Jennings et al. | 370/352 |
| 6,707,580 B1 | 3/2004 | Bloomfield | |
| 7,093,136 B2 | 8/2006 | Decuir | |
| 7,194,516 B2 * | 3/2007 | Giacobbe et al. | 709/206 |
| 7,239,629 B1 * | 7/2007 | Olshansky et al. | 370/353 |
| 7,280,738 B2 * | 10/2007 | Kauffman et al. | 386/281 |
| 7,962,644 B1 | 6/2011 | Ezerzer et al. | |
| 2002/0098831 A1 * | 7/2002 | Castell | H04L 12/589 455/413 |
| 2002/0124100 A1 | 9/2002 | Adams | |
| 2003/0110507 A1 | 6/2003 | Dimitrova et al. | |
| 2003/0177190 A1 * | 9/2003 | Moody et al. | 709/206 |
| 2004/0036700 A1 * | 2/2004 | Kashio | 345/660 |
| 2004/0137884 A1 * | 7/2004 | Engstrom | H04L 12/586 455/414.1 |
| 2005/0064883 A1 * | 3/2005 | Heck | H04L 12/5835 455/466 |
| 2005/0076110 A1 | 4/2005 | Mathew et al. | |
| 2005/0163289 A1 * | 7/2005 | Caspi | H04L 12/58 379/88.13 |

(Continued)

OTHER PUBLICATIONS

"Read Notify is the fastest, easiest, most reliable way to find out when email you've sent gets read". Posted at <http://www.readnotify.com/readnotify/text/faq.asp>. Jun. 6, 2004.*

(Continued)

*Primary Examiner* — Scott B Christensen
(74) *Attorney, Agent, or Firm* — Shumaker & Sieffert, P.A.

(57) ABSTRACT

In one embodiment, a method for maintaining real-time communications of a user includes receiving a user's real-time communications of different types over a network, presenting the real-time communications in an email inbox of the user in a uniform manner, and allowing the user to search contents of the real-time communications presented in the email inbox.

19 Claims, 6 Drawing Sheets

(56) References Cited

U.S. PATENT DOCUMENTS

2005/0223057 A1* 10/2005 Buchheit .............. G06Q 10/107
709/203
2005/0234850 A1* 10/2005 Buchheit ................ G06Q 10/10

OTHER PUBLICATIONS

USA Today, "Report: Google ready to walk the walk with text, voice IMs," Copyright 2005 Reuters Limited, http://www.usatoday.com/tech/news/2005-08-23-google-im_x.htm, 2 pages.

* cited by examiner

```
500
┌─────────────────────────────────────────┐
│ Saturday Concert 502          Inbox     │
├─────────────────────────────────────────┤
│ Chris To Kelly                          │
│ Email 504                               │
├─ ─ ─ ─ ─ ─ ─ ─ ─ ─ ─ ─ ─ ─ ─ ─ ─ ─ ─ ─ ┤
│ Kelly To Chris                          │
│ Email 504                               │
├─ ─ ─ ─ ─ ─ ─ ─ ─ ─ ─ ─ ─ ─ ─ ─ ─ ─ ─ ─ ┤
│ Chris To Kelly                          │
│ IM 506                                  │
├─ ─ ─ ─ ─ ─ ─ ─ ─ ─ ─ ─ ─ ─ ─ ─ ─ ─ ─ ─ ┤
│ Kelly To Chris                          │
│ Voice Message  508                      │
│                                         │
│ Transcript 510                          │
└─────────────────────────────────────────┘
```

FIG. 5

METHOD AND SYSTEM FOR STORING REAL-TIME COMMUNICATIONS IN AN EMAIL INBOX

This application is a continuation application of U.S. application Ser. No. 11/173,767, filed Jun. 30, 2005, which is hereby expressly incorporated by reference herein.

FIELD OF INVENTION

The field of invention relates generally to electronic mail (email) systems, and more particularly, to storing real-time communications in an email inbox.

BACKGROUND

The average individual accesses and manages a large number of various messages and documents every day. These messages may include, for example, email messages, faxes, voice messages, voice calls, text messages, and instant messages. The number of devices that individuals use for communications and messaging has also multiplied. Such devices include computers, fax machines, wire-line phones, wireless phones, personal digital assistants ("PDAs"), and pagers, with each device typically handling a different type of message or method of communications. Most individuals today manage their messages across different media and over multiple types of devices.

To help manage the complexity of multi-media messaging over numerous devices, unified communications solutions consolidate different types of messages into a single platform. Many of these platforms allow for remote access and management of messages over the Public Switched Telephone Network ("PSTN"), the Internet, as well as other public and private voice and data networks. For example, many voicemail platforms enable users to use the call-back number of a voicemail sender to return a call during the course of retrieving a voicemail. However, current communications systems do not provide convenient means for viewing and accessing various user communications.

SUMMARY

In one embodiment, a method for maintaining real-time communications of a user includes receiving a user's real-time communications of different types over a network, presenting the real-time communications in an email inbox of the user in a uniform manner, and allowing the user to search contents of the real-time communications presented in the email inbox.

BRIEF DESCRIPTION OF THE DRAWINGS

The present invention is illustrated by way of example and not limitation in the figures of the accompanying drawings, in which like references indicate similar elements and in which:

FIG. 5 illustrates the presentation of real-time communications of a user in an email inbox.

DETAILED DESCRIPTION

A method and system for maintaining real-time communications of a user is described. Real-time communications of the user may include, for example, email messages, instant messaging (IM) communications, voice messages, transcripts of voice messages, video messages, faxes, recorded phone conversations, etc. These different types of real-time communications may be received from various devices of the user. For example, IM communications may be received from the user's personal computer (PC) and/or hand-held device (e.g., personal digital assistant (PDA)), voice messages may be received from the user's telephone and/or mobile phone, and faxes may be received from the user's fax machine. The real-time communications of different types are presented in an email inbox in a uniform manner for access by the user. The user is allowed to search the contents of the real-time communications stored in the email inbox. In one embodiment, the real-time communications are displayed in the email inbox in the context of a conversation. For example, all real-time communications (chat messages, email messages, voice messages, etc.) relating to a specific topic may be displayed together in a chronological order. In another example, real-time communications of the user with a specific person may be displayed together in a chronological order.

Figure 1:
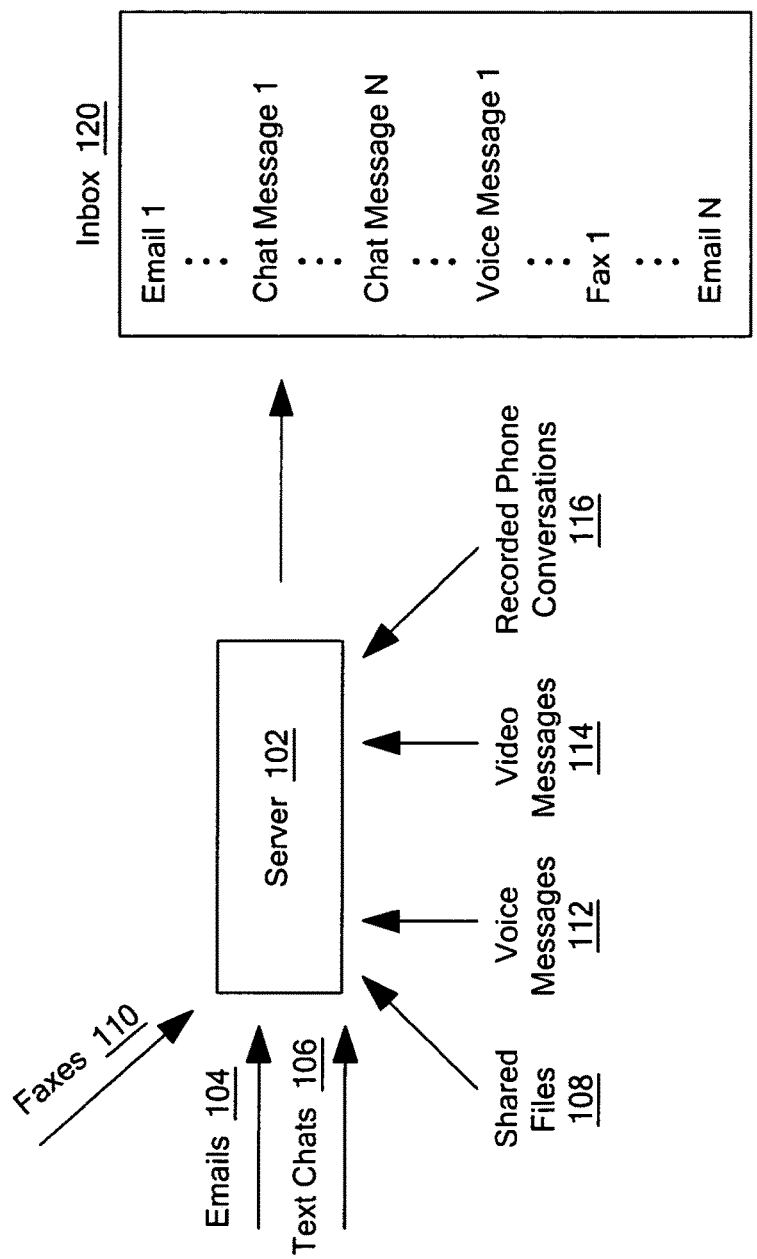
FIG. 1 presents a diagram illustrating an overview of one embodiment of the present invention.

FIG. 1 presents a diagram illustrating an overview of one embodiment of the present invention.

Referring to FIG. 1, a server 102 receives various communications of a user. These communications include email communications 104, text chat communications 106, shared files (e.g., image files music files, etc.) 108, voice messages 112, video messages 114, recorded phone conversations 116 and fax communications 110. The server 102 presents the user's communications in an email inbox 120 in a uniform manner. The user can then access these communications, perform searches on their content, and view these communications in the context of a conversation.

References throughout this specification to "one embodiment" or "an embodiment" indicate that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

Further, the term "document" as used herein broadly refers to various items, such as files, directories, or other data or information that may be stored, received, sent, created or otherwise processed by one or more computing devices. For example, a document may include any file created on a computing system. The term file as used herein includes a collection of bytes or bits stored as an individual entity. For example, a file may be a binary file, a text file, or a combination thereof, such as a word processor file, a data file, a spreadsheet, a workbook, an image, a drawing, an audio file, a video file, an audio/visual file, a multimedia file, an archive file, a batch file, a source file, an object file, or an executable program. The term file may also refer to a file system object which is accessed as though the object were a file. A document may be linked to one or more other documents, such as via a hyperlink. A document may include a web page, such as a file coded in a markup language (e.g. hypertext markup language (HTML) or extensible markup language (XML)), a file coded in a scripting language (e.g. JavaScript, Active Server Pages (ASP), or Perl), or a file viewed in a web browser (e.g. a portable document format (PDF), an image file or text file). A document may reside on a single system, or may be accessed by one or more systems via a network, e.g. an Intranet or the Internet.

Furthermore, the particular features, structures, or characteristics may be combined in any suitable manner in one or more embodiments.

System Architecture

Figure 2:
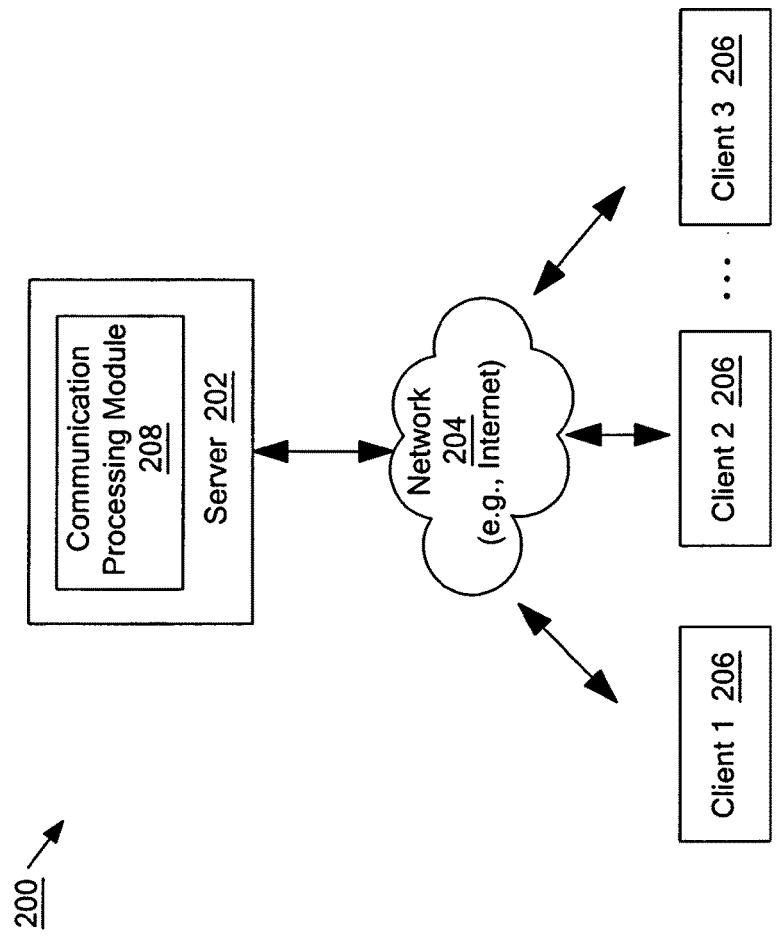
FIG. 2 is a block diagram illustrating an architecture in which one embodiment of the present invention may be implemented.

FIG. 2 is a block diagram illustrating an architecture 200 in which one embodiment of the present invention may be implemented. The architecture 200 includes client devices 206, a server 202, and a network 206.

The client devices 206 may be personal computers (PCs), telephones, mobile phones, palm-sized computing devices, personal digital assistants (PDAs), fax machines, consumer electronic devices, etc. The client devices 206 are coupled to the server 202 via the network 206, which may be a public network (e.g., Internet) or a private network (e.g., Ethernet or a local area Network (LAN)). Each client device 206 may send a user's real-time communications to the server 202. In one embodiment, the client device 206 includes a module that periodically collects real-time communications of the user, packages them into appropriate files (e.g., text files, audio files, video files, etc.) and sends these files to the server 202. Alternatively, an application handling specific real-time communications adds timestamps to the real-time communications and periodically sends these real-time communications to the server 202. For example, an IM application running on a client device 206 may inform the server 202 about a new chat session, and then send each communication received and sent by the user of the client device 206 during this chat session to the server 202 as a message with the chat session ID and the timestamp of the communication. In one embodiment, a continuous chat log of a chat session is divided into separate conversations and each separate conversation is sent to the server 202 as a message or a text file. The split of the chat log may occur, for example, when the conversation has stopped for a predefined time interval (e.g., a few minutes). In one embodiment, the IM application may also send to the server 202 IM subscription messages received by the user. One example of an IM subscription message is a message saying "I want to be a buddy—is that OK?".

The real time communications sent by a client device 206 may be of a specific type. For example, a client device 206 may be a fax machine that sends electronic copies of faxes to the server 202, or a telephone that sends voice messages to the server 202. Alternatively, a client device 206 may send communications of different types. For example, a client device 206 may be a PC running a mail client application, which sends to the server 202 email messages and live video made by a built-in camera. The PC may also run an IM application that archives text chat communications that may be sent to the server 202. If the IM application allows users to share files (e.g., image files, music files, etc.) during a chat session, the shared files may also be sent to the server 202 along with the text chat communications. In another example, a client device 206 may be a mobile phone that sends email messages and IM communications, as well as voice messages and recorded phone conversations, to the server 202.

The server 202 includes a communication processing module 208. In one embodiment, the communication processing module 208 is part of an email service. Alternatively, the communication processing module 208 may be part of a different service or be an independent application. The communication processing module 208 is responsible for receiving real-time communications associated with different users from various clients 206 and presenting real-time communications of each user in an email inbox of that user in a uniform matter. In particular, in one embodiment, the communication processing module 208 receives the real-time communications of different types (e.g., chat messages, email messages, image files, audio files, video files, etc.) from various clients 206, stores these communications as appropriate files in different repositories (e.g., a repository of text files, a repository of image files, a repository of audio files, a repository of video files, etc.), creates a record for each received communication to identify the communication (e.g., a chat session ID and timestamp of the communication) and specify a link to the corresponding file, and stores the records in a centralized database. For example, the communication processing module 208 may receive a message with a new chat session ID from a client device 206, and create a record for this chat session ID in the centralized database. Subsequently, the communication processing module 208 may create a new record for each communication received from the client device 206 that is associated with this chat session ID, store this communication as a text file in the repository of text files, and add the new record with the name and location of the text file to the centralized database. In one embodiment, each communication is received from the client device 206 with an indicator specifying whether this communication has been "already read" or "unread" (e.g., whether the recipient is currently online and can receive the IM message or whether the recipient is currently offline). Based on this indicator, the record created in the centralized database specifies whether the corresponding communication has been "read" or "unread" by the user. In one embodiment, each "unread" communication is assigned an identifier, which is subsequently used by the IM application to inform the communication processing module 208 that the relevant communication has been read by the recipient.

The communication processing module 208 accesses the records associated with a specific user in the centralized database when presenting real-time communications in the email inbox of the user. The communications displayed in the email inbox may be marked as "read" or "unread" based on the information stored in the centralized database. The communication processing module 208 may also access the records associated with a specific user in the centralized database to allow the user to search the contents of the real-time communications collected in the email inbox and to view the communications in the context of a conversation.

Figure 3:
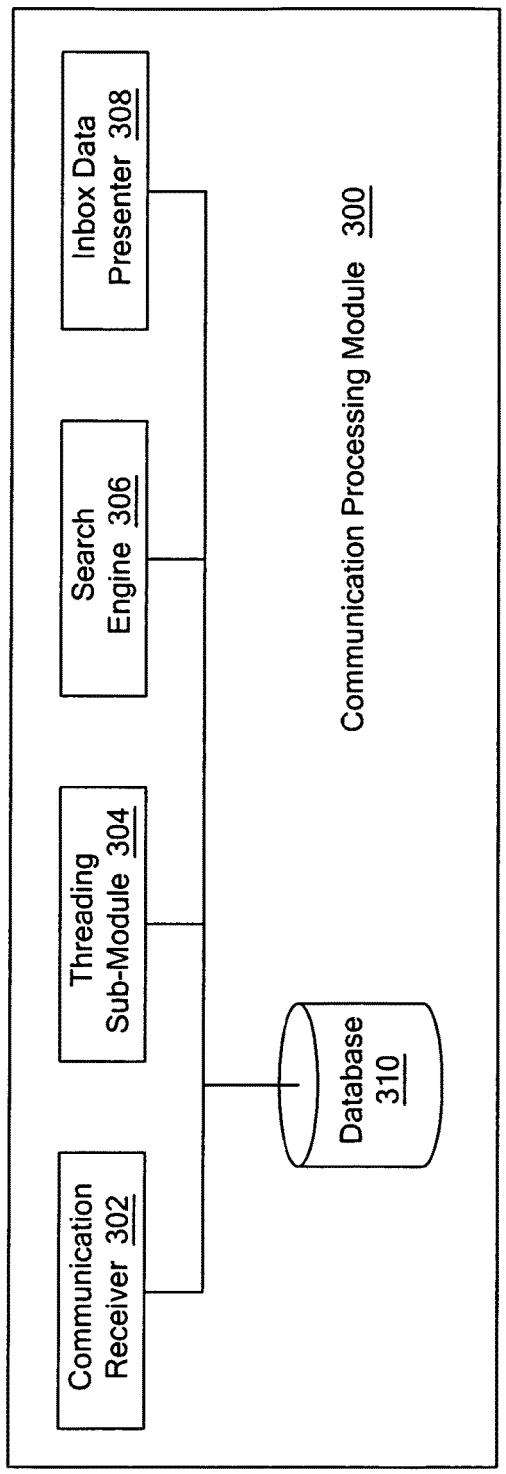
FIG. 3 is a block diagram of one embodiment of a communication processing module.

FIG. 3 is a block diagram of one embodiment of a communication processing module 300. The module 300 includes a communication receiver 302, a threading sub-module 304, a search engine 306, an inbox data presenter 308, and a database 310.

The communication receiver 302 is responsible for receiving real-time communications from various client devices, associating the real-time communications with specific users, and storing the real-time communications in the database 310. As discussed above, real-time communications of a user may include, for example, email messages, IM communications, voice messages, transcripts of voice messages, video messages, faxes, recorded phone conversations, etc. In one embodiment, the communication receiver 302 notifies the user that a communication of a certain type has been received (e.g., displays the message "You've got voice mail").

In one embodiment, the communication receiver 302 stores real-time communications of different types as appropriate files in different repositories (e.g., a repository of text files, a repository of image files, a repository of audio files, a repository of video files, etc.), and creates a record for each received communication in the database 310. The record may identify the communication (e.g., a chat session ID and timestamp of the communication), specify a link to the corresponding file, indicate whether this communication has been "read" or "unread" by the recipient, and include other information. In one embodiment, each "unread" communication is assigned an identifier, which may subsequently be used by the IM application to inform the communication receiver 302 that the relevant communication has been read by the recipient.

The threading sub-module 304 is responsible for identifying related real-time communications (e.g., IM communications from the same chat session) and adding a common thread identifier to all related communications in the database 310. In one embodiment, the treading sub-module 304 updates a record in the database 310 when a corresponding "unread" communication has been read by the user in the email inbox and notifies a relevant client application (e.g., an IM application) when an unread communication (e.g., chat communication) has been read in the email inbox. As a result, next time the user launches the relevant client application, the communications associated with this client application that have been "read" in the email inbox are displayed as "read" or are not displayed at all by the client application.

The inbox data presenter 308 is responsible for presenting the real-time communications of different types in an email inbox of the user in a uniform manner based on the contents of the database 310. In one embodiment, the inbox data presenter 308 presents communications in the context of a conversation. In one embodiment, each communication presented in the email inbox is displayed with an indicator of its type (e.g., an IM icon, a voice message icon, etc.). In one embodiment, a transcription is provided for each voice message and video message in the email inbox.

The search engine 306 is responsible for performing searches on the contents of communications stored in the email inbox. A search may be performed based on criteria specified by the user. The criteria may include keywords, the date range, the recipient or sender name, the type of real-time communications, etc. In one embodiment, the results that satisfy the specified criteria are displayed as conversations with the most recent communications at the top.

Description of Process

Figure 4:
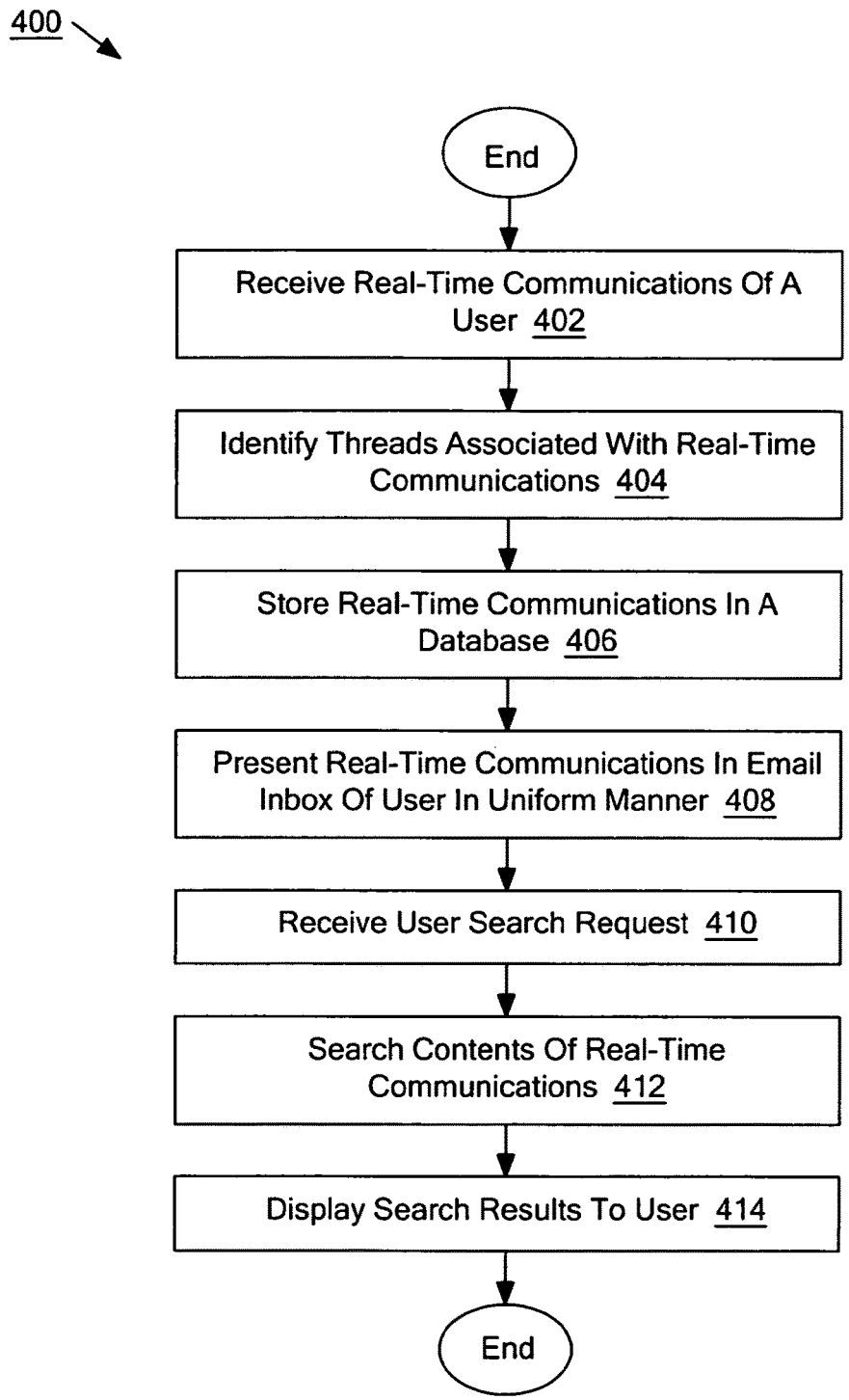
FIG. 4 is a flow diagram of one embodiment of a method for handling real-time communications of a user.

FIG. 4 presents a flow diagram of one embodiment of a method 400 for maintaining real-time communications of a user. The method may be performed by processing logic, which may comprise hardware, software, or a combination of both. Processing logic may reside either in the server 202, or partially or entirely in a separate device and/or system(s).

At block 402, processing logic receives a user's real-time communications of different types. These real-time communications may include, for example, email messages, IM communications, voice messages, transcripts of voice messages, video messages, transcripts of video messages, electronic copies of faxes, recorded phone conversations, etc. The real-time communications may be received from different devices of the user such as the user's computers at home and at work, PDA, mobile phone, fax machine, etc. Each received real-time communication contains a unique identifier of the user (e.g., the user's email address, the user's IM identifier, the user's phone number, etc.). In one embodiment, processing logic notifies the user about a newly received real-time communication.

At processing block 404, processing logic identifies related communications of the user and assigns a common thread ID to all related communications. The communications may be related if, for example, they pertain to the same topic, are exchanged between the same individuals, etc.

At processing block 406, processing logic stores the real-time communications in a database. In one embodiment, processing logic stores real-time communications as appropriate files in corresponding repositories and creates a record in a centralized database for each communication, as discussed above.

At processing block 408, processing logic presents the real-time communications in an email inbox of the user in a uniform manner. The user may then access any communication stored in the email inbox. For example, the user may click on a displayed link to a voice message and listen to the voice message or the user may click on a displayed link to a video message and view the video. In another example, the user may view text chat message exchanged during a chat session and access files (e.g., image files or music files) shared during the chat session. The user may also forward various communications (e.g., voice messages, IM communications, etc.) to desired recipients. In one embodiment, the email inbox includes a link to the IM roster and a link to the list of users currently present online.

At processing block 410, processing logic receives a user request to search the content of the communications stored in the email inbox. The user request may specify a keyword, a date range, the recipient or sender name, the type of real-time communications, etc.

At processing block 412, processing logic searches the contents of the stored real-time communications based on the criteria specified by the user. In one embodiment, processing logic searches a transcript of each stored voice or video message.

At processing block 414, processing logic displays the search results to the user. In one embodiment, the results that satisfy the specified criteria are displayed as a conversation with the most recent communications at the top.

FIG. 5 illustrates the presentation of real-time communications of a user in an email inbox 500. The displayed communications relate to topic 502 identified as "Saturday Concert" and include email messages 504, IM communications 506 and a voice message 508 with its transcript 510.

In one embodiment, some email features operate differently with different types of communications. For example, if the user selects the "respond" option for a voice message, the phone number of the voice message sender is automatically dialed. Alternatively, if the user selects the "respond" option for an IM communication, the IM application is automatically launched and a chat window is opened if the other participant is currently present online. In another embodiment, some email features may be disabled for certain types of communications. For example, the "respond" option may be enabled for email messages but disabled for voice messages and IM communications.

Exemplary Computer System

Figure 6:
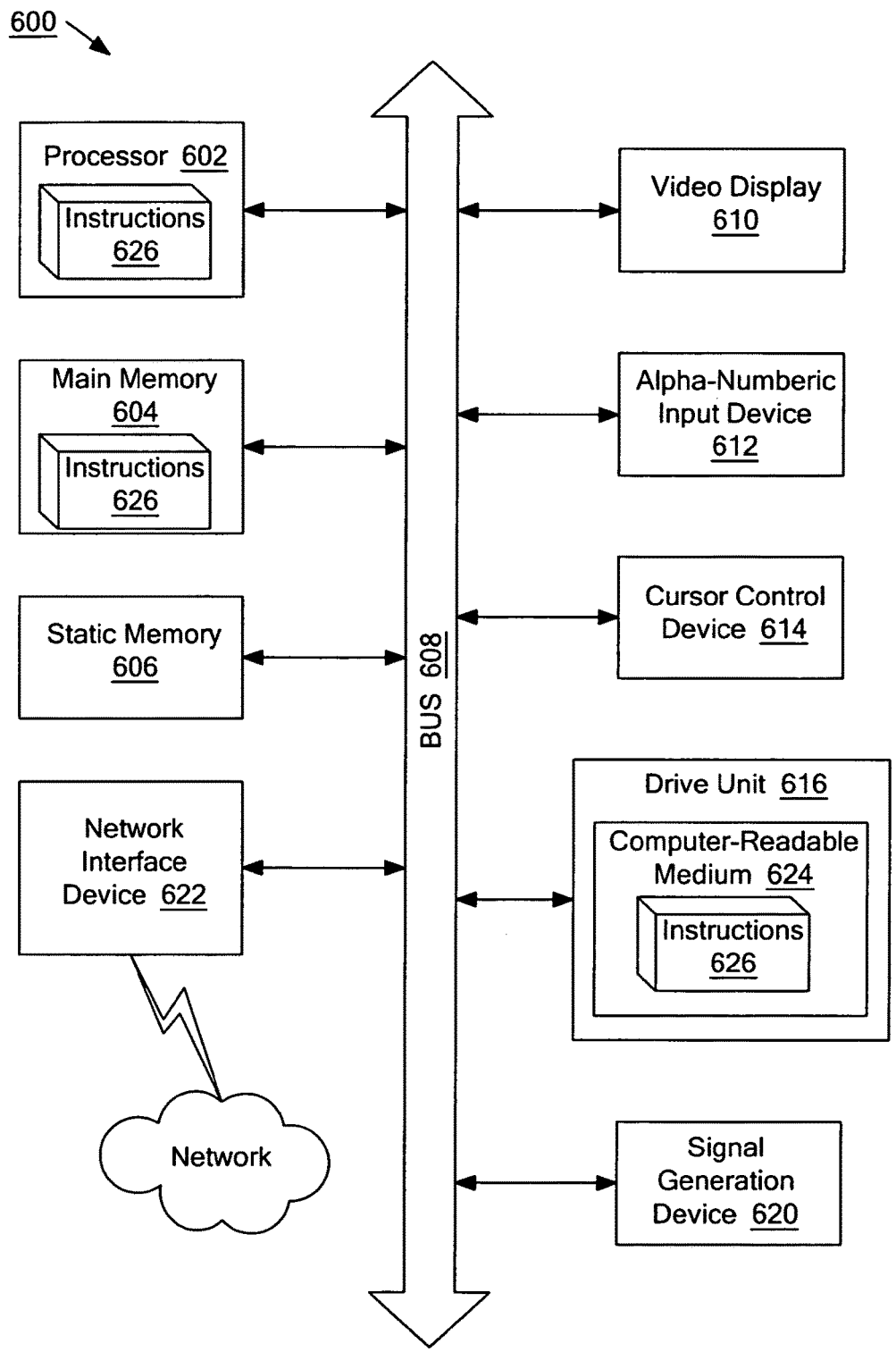
FIG. 6 is a block diagram of one embodiment of a computer system.

FIG. 6 shows a diagrammatic representation of a machine in the exemplary form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620.

While the machine-readable medium 622 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical and magnetic media, and carrier wave signals.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A computer-implemented method comprising:
   receiving, at a server, a first real-time communication of a first type and a second communication of a second type different from the first type, wherein the first real-time communication and the second communication are each associated with a first user, wherein the first real-time communication includes a recorded voice or video communication;
   determining, by the server and based at least in part on a transcription of content of the recorded voice or video communication, that the first real-time communication and the second communication are related;
   responsive to determining that the first real-time communication and the second communication are related:
      generating, by the server, an identifier that indicates a relationship between the first real-time communication and the second communication;
      associating, by the server, the identifier with each of the first real-time communication and the second communication; and
      providing, by the server and to a first client device associated with the first user, respective indications of the first real-time communication, the second communication, and the identifier associated with each of the first real-time communication and the second communication for display in an email interface of the first client device, wherein the respective indications of the first real-time communication and the second communication are displayable contemporaneously in the email interface within a context of a conversation, between at least the first user and a second user associated with at least a second client device, which includes at least the first real-time communication that is of a different type than the second communication.

2. The computer-implemented method of claim 1, wherein the first real-time communication comprises at least a recorded voice message or a recorded video message.

3. The computer-implemented method of claim 1, further comprising:
   sending, by the server to the at least one client device, the transcription of content of the recorded voice or video communication of the first real-time communication for display in the email interface.

4. The computer-implemented method of claim 3, further comprising:
   receiving, by the server, and from the at least one client device associated with the first user, a criterion; and
   searching, by the server, the transcription of the content of the recorded voice or video communication of the first real-time communication based at least in part on the criterion.

5. The computer-implemented method of claim 1,
wherein the first real-time communication is sent by the first user to the second user, and
wherein the second communication is sent by the second user to the first user.

6. The computer-implemented method of claim 1, further comprising:
sending, by the server, an indicator to the at least one client device for display in the email interface that indicates the first type of the first real-time communication or the second type of the second communication.

7. The method of claim 1, further comprising:
responsive to the first real-time communication and second communication being displayed in the email interface of the first client device, determining, by the server, that a particular communication from the transcription of content of the recorded voice or video communication of the first real-time communication or the second communication has been read at the first client device associated with the first user; and
responsive to determining that the particular communication has been read at the first client device associated with the first user, providing, by the server and to the at least first client device associated with the first user, for display in an application interface of the first client device, an indication that the particular communication has been read,
wherein the application interface corresponds to a client application associated with the particular communication,
wherein the email interface corresponds to an email application, and
wherein the client application is different from the email application.

8. The method of claim 7, wherein the particular communication includes the second communication, and wherein the client application includes an instant message application.

9. An apparatus comprising:
at least one processor; and
at least one module operable by the at least one processor to:
receive a first real-time communication of a first type and a second communication of a second type different from the first type, wherein the first real-time communication and the second communication are each associated with a first user, wherein the first real-time communication includes a recorded voice or video communication;
determine, based at least in part on a transcription of content of the recorded voice or video communication, that the first real-time communication and the second communication are related;
responsive to determining that the first real-time communication and the second communication are related:
generate an identifier that indicates a relationship between the first real-time communication and the second communication;
associate the identifier with each of the first real-time communication and the second communication; and
provide to a first client device associated with the first user, respective indications of the first real-time communication, the second communication, and the identifier associated with each of the first real-time communication and the second communication, for display in an email interface of the first client device, wherein the respective indications of the first communication and the second communication are displayable contemporaneously in the email interface within a context of a conversation, between at least the first user and a second user associated with at least a second client device, which includes at least the first real-time communication that is of a different type than the second communication.

10. The apparatus of claim 9, wherein the first real-time communication comprises at least a recorded voice message or a recorded video message.

11. The apparatus of claim 9, wherein the at least one module is operable by the at least one processor to:
send to the at least one client device, the transcription of content of the recorded voice or video communication of the first real-time communication for display in the email interface.

12. The apparatus of claim 11, wherein the at least one module is operable by the at least one processor to:
receive from the at least one client device associated with the first user, a criterion; and
search the transcription of the content of the recorded voice or video communication of the first real-time communication based at least in part on the criterion.

13. The apparatus of claim 9,
wherein the first real-time communication is sent by the first user to the second user, and
wherein the second communication is sent by the second user to the first user.

14. The apparatus of claim 9, wherein the at least one module is operable by the at least one processor to:
send an indicator to the at least one client device for display in the email interface that indicates the first type of the first real-time communication or the second type of the second communication.

15. A non-transitory computer readable medium encoded with instructions, that when executed, cause at least one processor to perform operations comprising:
receiving a first real-time communication of a first type and a second communication of a second type different from the first type, wherein the first real-time communication and the second communication are each associated with a first user, wherein the first real-time communication includes a recorded voice or video communication; and
determining, based at least in part on a transcription of content of the recorded voice or video communication, that the first real-time communication and the second communication are related;
responsive to determining that the first real-time communication and the second communication are related:
generating an identifier that indicates a relationship between the first real-time communication and the second communication;
associating the identifier with each of the first real-time communication and the second communication; and
providing to a first client device associated with the first user, respective indications of the first real-time communication, the second communication, and the identifier associated with each of the first real-time communication and the second communication for display in an email interface of the first client device, wherein the respective indications of the first real-time communication and the second communication are displayable contemporaneously in the email interface within a context of a conversation, between at least the first user and a second user associated with at least a second client device, which includes at least the first real-time communication that is of a different type than the second communication.

16. The non-transitory computer readable medium of claim 15, wherein the first real-time communication comprises at least a recorded voice message or a recorded video message.

17. The non-transitory computer readable medium of claim 15, encoded with instructions, that when executed, cause the at least one processor to perform operations comprising:
sending to the at least one client device, the transcription of content of the recorded voice or video communication of the first real-time communication for display in the email interface that is associated with the first user.

18. The non-transitory computer readable medium of claim 17, encoded with instructions, that when executed, cause the at least one processor to perform operations comprising:
receiving from the at least one client device associated with the first user, a criterion; and
searching the transcription of the content of the recorded voice or video communication of the first real-time communication based at least in part on the criterion.

19. The non-transitory computer readable medium of claim 15, encoded with instructions, that when executed, cause the at least one processor to perform operations comprising:
sending an indicator to the at least one client device for display in the email interface that indicates the first type of the first real-time communication or the second type of the second communication.

* * * * *